United States Patent
Inuzuka et al.

(10) Patent No.: US 11,623,419 B2
(45) Date of Patent: *Apr. 11, 2023

(54) METHOD OF PRODUCING PHOTOCHROMIC RESIN BODY AND METHOD OF PRODUCING FUNCTION-ADDING BASE BODY

(71) Applicant: NIDEK CO., LTD., Aichi (JP)

(72) Inventors: Minoru Inuzuka, Aichi (JP); Koji Abe, Aichi (JP); Takahisa Shibamoto, Aichi (JP)

(73) Assignee: NIDEK CO., LTD., Aichi (JP)

( * ) Notice: Subject to any disclaimer, the term of this patent is extended or adjusted under 35 U.S.C. 154(b) by 425 days.

This patent is subject to a terminal disclaimer.

(21) Appl. No.: 16/830,962

(22) Filed: Mar. 26, 2020

(65) Prior Publication Data
US 2020/0307131 A1    Oct. 1, 2020

(30) Foreign Application Priority Data

Mar. 29, 2019 (JP) ............................. JP2019-065856

(51) Int. Cl.
*B29D 11/00* (2006.01)
*G02B 1/04* (2006.01)
(Continued)

(52) U.S. Cl.
CPC .......... *B29D 11/00653* (2013.01); *C09B 7/08* (2013.01); *C09K 9/00* (2013.01);
(Continued)

(58) Field of Classification Search
CPC .... B29D 11/00653; G02B 1/041; G02B 5/23; C09K 9/00; C09K 2211/1018; C09B 7/08
See application file for complete search history.

(56) References Cited

U.S. PATENT DOCUMENTS

| 5,914,193 A |   | 6/1999  | Ono et al. |            |
|-------------|---|---------|------------|------------|
| 5,975,696 A | * | 11/1999 | Kohan      | G02B 5/23  |
|             |   |         |            | 351/159.61 |

(Continued)

FOREIGN PATENT DOCUMENTS

| EP | 1 612 042 A1 | 1/2006 |
| EP | 2 287 222 A1 | 2/2011 |

(Continued)

OTHER PUBLICATIONS

Communication dated Jul. 12, 2022 by the China National intellectual Property Administration in Chinese Patent Application No. 202010226201.9.

(Continued)

*Primary Examiner* — Bijan Ahvazi
(74) *Attorney, Agent, or Firm* — Sughrue Mion, PLLC (57) ABSTRACT

A method of producing a photochromic resin body includes a first step, a second step and a third step. In the first step, a sublimable photochromic dye having sublimability is applied to a base body so as to obtain a function-adding base body. In the second step, the function-adding base body obtained in the first step is set to face a resin body, the function-adding base body is heated to sublimate the sublimable photochromic dye applied to the function-adding base body, and the sublimable photochromic dye is deposited on the resin body. In the third step, the resin body on which the sublimable photochromic dye is deposited in the second step is heated to fix the sublimable photochromic dye on the resin body.

5 Claims, 4 Drawing Sheets

(51) Int. Cl.
*C09K 9/00* (2006.01)
*C09B 7/08* (2006.01)
*G02B 5/23* (2006.01)

(52) U.S. Cl.
CPC ............... *G02B 1/041* (2013.01); *G02B 5/23* (2013.01); *C09K 2211/1018* (2013.01)

(56) References Cited

U.S. PATENT DOCUMENTS

| | | | |
|---|---|---|---|
| 6,520,999 B1* | 2/2003 | Kamata | C23C 14/0015 156/240 |
| 10,577,746 B2* | 3/2020 | Inuzuka | D06P 5/02 |
| 2001/0018114 A1* | 8/2001 | Inuzuka | B29D 11/00903 503/227 |
| 2002/0136899 A1 | 9/2002 | deRojas et al. | |
| 2006/0263607 A1 | 11/2006 | Izumi et al. | |
| 2011/0043902 A1 | 2/2011 | Ishibashi et al. | |

FOREIGN PATENT DOCUMENTS

| | | |
|---|---|---|
| JP | 11-129337 A | 5/1999 |
| JP | 11-142612 A | 5/1999 |
| JP | 11-160501 A | 6/1999 |
| JP | 11-170387 A | 6/1999 |
| JP | 2001-159746 A | 6/2001 |
| JP | 2013-205559 A | 10/2013 |
| JP | 2018-132782 A | 8/2018 |

OTHER PUBLICATIONS

Communication dated Jul. 6, 2020, from the European Patent Office in European Application No. 20165472.0.
Communication dated Jan. 10, 2023 issued by the Japanese Patent Office in counterpart Japanese Patent Application No. 2019-065856.

* cited by examiner

| | Sublimable photochromic dye | Lens type | Photochromic performance evaluation | Color unevenness evaluation | Color after color development |
|---|---|---|---|---|---|
| Experimental Example 1 | 1,3,3-trimethyl-spiro[benzo[e]indole-2,3'-[3H]-naphtho[2,1-b][1,4]oxazine] | CR39 | Excellent | Excellent | Developed blue |
| Experimental Example 2 | 1,3,3-trimethyl-spiro[benzo[e]indole-2,3'-[3H]-naphtho[2,1-b][1,4]oxazine] | Medium-refractive lens | Excellent | Excellent | Developed blue |
| Experimental Example 3 | 6'-indolino-1,3,3-trimethyl-spiro[indole-2,3'-[3H]-naphtho[2,1-b][1,4]oxazine] | CR39 | Excellent | Excellent | Developed redish blue |
| Experimental Example 4 | 6'-indolino-1,3,3-trimethyl-spiro[indole-2,3'-[3H]-naphtho[2,1-b][1,4]oxazine] | Medium-refractive lens | Excellent | Excellent | Developed redish blue |
| Experimental Example 5 | 3,3-diphenyl-3H-naphtho[2,1-b]pyran | CR39 | Excellent | Excellent | Developed yellow |
| Experimental Example 6 | 3,3-diphenyl-3H-naphtho[2,1-b]pyran | Medium-refractive lens | Excellent | Excellent | Developed yellow |
| Experimental Example 7 | 3(4-methoxy)phenyl-3H-naphtho[2,1-b]pyran | CR39 | Excellent | Excellent | Developed redish yellow |
| Experimental Example 8 | 3(4-methoxy)phenyl-3H-naphtho[2,1-b]pyran | Medium-refractive lens | Excellent | Excellent | Developed redish yellow |
| Experimental Example 9 | 6-trifluoromethyl-1,3,3-trimethyl-6'-piperidino-spiro[indole-2,3'-[3H]-naphtho[2,1-b][1,4]oxazine] | CR39 | Excellent | Excellent | Developed blueish red |
| Experimental Example 10 | 6-trifluoromethyl-1,3,3-trimethyl-6'-piperidino-spiro[indole-2,3'-[3H]-naphtho[2,1-b][1,4]oxazine] | Medium-refractive lens | Excellent | Excellent | Developed blueish red |
| Experimental Example 11 | 1,3-dihydro-1,3,3-trimethyl-6'-(1-piperidinyl)-spiro[2H-indole-2,3'-[3H]-naphtho[2,1-b][1,4]oxazine] | CR39 | Excellent | Excellent | Developed purple |
| Experimental Example 12 | 1,3-dihydro-1,3,3-trimethyl-6'-(1-piperidinyl)-spiro[2H-indole-2,3'-[3H]-naphtho[2,1-b][1,4]oxazine] | Medium-refractive lens | Excellent | Excellent | Developed purple |

Fig. 3 (cont.)

| Experimental Example 13 | 2,2-diphenyl-2H-naphtho[2,1-b]pyran | CR39 | Excellent | Excellent | Developed yellow |
|---|---|---|---|---|---|
| Experimental Example 14 | 2,2-diphenyl-2H-naphtho[2,1-b]pyran | Medium-refractive lens | Excellent | Excellent | Developed yellow |
| Experimental Example 15 | 1,3,3-trimethylindolino-6'-nitrobenzopyrospirane | CR39 | Excellent | Excellent | Developed blueish red |
| Experimental Example 16 | 1,3,3-trimethylindolino-6'-nitrobenzopyrospirane | Medium-refractive lens | Excellent | Excellent | Developed blueish red |
| Experimental Example 17 | (E)-3-(adamantane-2-ylidene)-4-[1-(2,5-dimethyl-3-noryl)ethylidene]dihydro-2,5-furandione | CR39 | Excellent | Excellent | Developed blueish red |
| Experimental Example 18 | (E)-3-(adamantane-2-ylidene)-4-[1-(2,5-dimethyl-3-noryl)ethylidene]dihydro-2,5-furandione | Medium-refractive lens | Excellent | Excellent | Developed blueish red |
| Experimental Example 19 | 4,4'-bis(hexyloxy)-3-methylazobenzene | CR39 | Good | Good | Developed yellow |
| Experimental Example 20 | 4,4'-bis(hexyloxy)-3-methylazobenzene | Medium-refractive lens | Good | Good | Developed yellow |
| Experimental Example 21 | 4,4'-bis(decyloxy)-3-methylazobenzene | CR39 | Good | Good | Developed yellow |
| Experimental Example 22 | 4,4'-bis(decyloxy)-3-methylazobenzene | Medium-refractive lens | Good | Good | Developed yellow |
| Experimental Example 23 | 1,2-bis(2,4-dimethyl-5-phenyl-3-thienyl)-3,3,4,4,5,5-hexafluoro-1-cyclopentene | CR39 | Good | Excellent | Developed blueish red |
| Experimental Example 24 | 1,2-bis(2,4-dimethyl-5-phenyl-3-thienyl)-3,3,4,4,5,5-hexafluoro-1-cyclopentene | Medium-refractive lens | Good | Excellent | Developed blueish red | ns
METHOD OF PRODUCING PHOTOCHROMIC RESIN BODY AND METHOD OF PRODUCING FUNCTION-ADDING BASE BODY

CROSS-REFERENCE TO RELATED APPLICATION

This application claims priority from Japanese Patent Application No. 2019-065856 filed on Mar. 29, 2019, the entire subject-matter of which is incorporated herein by reference.

TECHNICAL FIELD

The present disclosure relates to a method of producing a photochromic resin body and a method of producing a function-adding base body used in the method of producing the photochromic resin body.

BACKGROUND

In the related art, a photochromic resin body obtained by adding a photochromic performance to a resin body has been proposed. Examples of the photochromic resin body include a photochromic lens obtained by adding a photochromic performance to a lens. In related art, for example, various methods of producing such photochromic resin body have been proposed. For example, a method of kneading a photochromic dye into a resin body and a method of immersing a lens in a liquid in which a photochromic dye is dispersed for a predetermined time (immersion method) (for example, JP-A-H11-129337) or the like is used.

However, a photochromic resin body produced by the method in related art has only a single-color design or a simple design, and has poor designability. In addition, when the photochromic performance is added to a plurality of resin bodies in the same design pattern, it is difficult to perform the addition of the photochromic performance in the same design pattern with good reproducibility with respect to the plurality of resin bodies.

In addition, in order to add a desired photochromic performance to the photochromic resin body produced by the method of the related art, it is necessary to perform many processes and complicated operations, which costs labor and time.

SUMMARY

An object of the present disclosure is to provide a method of producing a photochromic resin body, which enables to easily produce the photochromic resin body and enables to apply various design patterns on the photochromic resin body and improve reproducibility.

There is provided with a method of producing a photochromic resin body, including:

a first step of applying a sublimable photochromic dye having sublimability to a base body to obtain a function-adding base body;

a second step of setting the function-adding base body obtained in the first step to face a resin body, of heating the function-adding base body to sublimate the sublimable photochromic dye applied to the function-adding base body, and of depositing the sublimable photochromic dye on the resin body; and a third step of heating the resin body on which the sublimable photochromic dye is deposited in the second step to fix the sublimable photochromic dye on the resin body.

There is provided with a method of producing a function-adding base body used in a step of setting the function-adding base body to face a resin body, of heating the function-adding base body to sublimate a sublimable photochromic dye, and of depositing the sublimable photochromic dye on the resin body, the method of producing the function-adding base body, including:

a first step of obtaining the function-adding base body by discharging a function-adding ink containing the sublimable photochromic dye from an inkjet head of a printing apparatus toward a base body to print the sublimable photochromic dye on the base body.

BRIEF DESCRIPTION OF DRAWINGS

FIG. 3 is a table showing results of experimental examples 1 to 24.

DETAILED DESCRIPTION

<Production System for Photochromic Resin Body>

Figure 1:
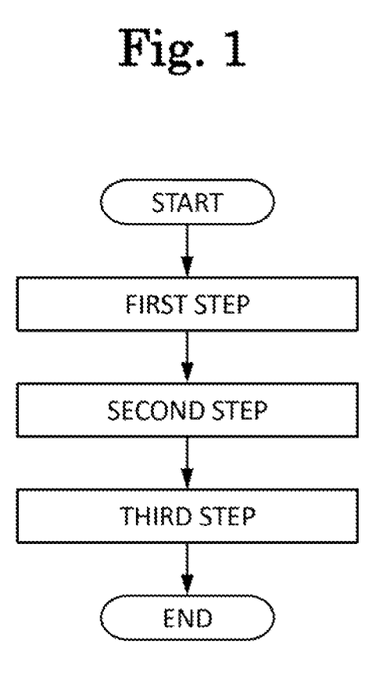
FIG. 1 is a flowchart showing a flow of a production method of the present embodiment.
Figure 2:
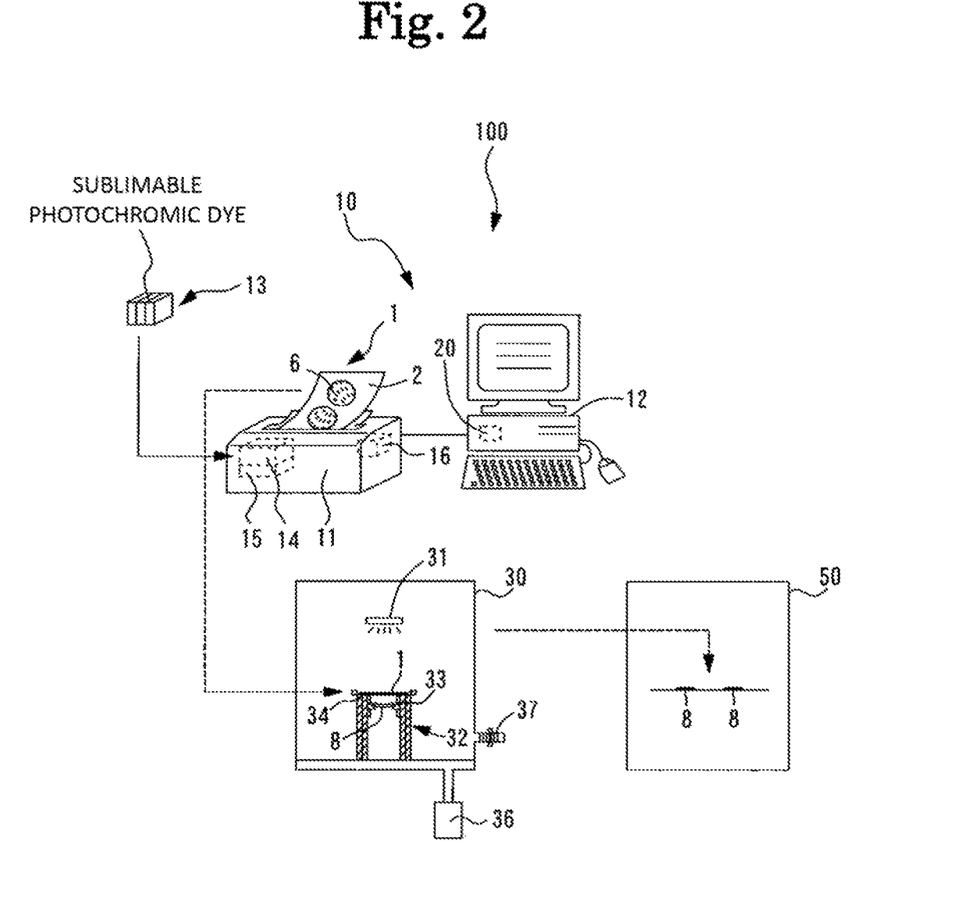
FIG. 2 is a schematic view showing a production system used in the production method of the present embodiment.

Hereinafter, exemplary embodiments of the present disclosure will be described. For example, FIG. 1 is a flowchart showing a flow of a method of producing a photochromic resin body of the present embodiment. For example, FIG. 2 is a schematic view showing a production system used in the method of producing the photochromic resin body of the present embodiment.

For example, the photochromic resin body to which the photochromic performance is added is a resin body having a property that color tone or color density of the photochromic resin body are changed by irradiation of light (for example, ultraviolet rays) to the photochromic resin body. In addition, for example, the photochromic resin body has a property in which the changed color tone or color density returns to an original state by stopping the irradiation of light to the photochromic resin body. As an example, when the photochromic resin body is irradiated with ultraviolet rays, the photochromic resin body is colored, and when the irradiation of the ultraviolet rays is stopped, the color of the photochromic resin body disappears with a lapse of time.

In the following description, a case of producing a photochromic lens by adding the photochromic performance to a lens 8, which is a resin body, with using a vapor phase transfer dyeing method will be described as an example. The technique of the present disclosure can be applied to the lens 8 regardless of a refractive power. For example, the technique of this disclosure may be applied to lenses having various refractive powers (e.g., low diopter, high diopter, 0 diopters, etc.). The technology exemplified below can also be applied to a case where photochromic performance is added by using a vapor phase transfer dyeing method with respect to a resin body other than the lens 8 (for example, a molded article such as goggles, a cover of a mobile phone, a cover for light, an accessory, a toy, a film (having a thickness of, for example, 400 µm or less), and a plate material (having a thickness of, for example, 400 µm or more)). The resin body also includes a member obtained by adding a resin to a member (for example, wood, glass, or the like). In this case, the photochromic performance may be added to the resin by using the vapor phase transfer dyeing method. The function-adding base body 1 exemplified below can also be used in a transfer dyeing process other than the vapor phase transfer dyeing.

For example, in the method of producing the photochromic resin body of the present embodiment, a first step, a second step, and a third step are performed. For example, the method of producing the photochromic resin body of the present embodiment is performed in an order of the first step, the second step, and the third step. For example, the first step is a process of applying a sublimable photochromic dye having sublimability to a base body (for example, a base body 2), that is, coating the base body with the sublimable photochromic dye, so as to obtain a function-adding base body (for example, a function-adding base body 1). For example, the second step is a process of setting the function-adding base body obtained in the first step to face a resin body (for example, the lens 8), of heating the function-adding base body so as to sublimate the sublimable photochromic dye applied to the function-adding base body, and of depositing the sublimable photochromic dye on the resin body. For example, the third step is a process of heating the resin body on which the sublimable photochromic dye is deposited in the second step so as to fix the sublimable photochromic dye on the resin body.

As described above, for example, the method of producing the photochromic resin body according to the present embodiment includes: the first step of applying the sublimable photochromic dye having sublimability to the base body so as to obtain the function-adding base body; the second step of setting the function-adding base body obtained in the first step to face a resin body, of heating the function-adding base body so as to sublimate the sublimable photochromic dye applied to the function-adding base body, and of depositing the sublimable photochromic dye on the resin body; and the third step of heating the resin body on which the sublimable photochromic dye is deposited in the second step so as to fix the sublimable photochromic dye on the resin body. As a result, a good photochromic resin body can be easily obtained.

In addition, the method exhibits particularly excellent effects as a production method capable of adding a photochromic performance to the resin body in various design patterns such as a fine design and a gradation design, and capable of improving the designability. Further, for example, it is possible to add the photochromic performance to the resin body in the same design pattern, thereby improving the reproducibility of the design pattern when the photochromic resin body is produced.

For example, when a photochromic resin body obtained by adding the photochromic performance to a resin body in various design patterns is produced, the design patterns appear or disappear based on the presence or absence of light irradiation to the photochromic resin body.

For example, in the present embodiment, as the sublimable photochromic dye, at least one of a spirooxazine-based, a naphthopyran-based, a spiropyran-based, a fulgide-based, a diarylethene-based, and an azobenzene-based sublimable photochromic dye may be used. The sublimable photochromic dye is not limited to the above dye, and any sublimable photochromic dye having sublimability and having photochromic performance may be used.

For example, in the technology of the present disclosure, as a more preferable sublimable photochromic dye, at least one of a spirooxazine-based, a naphthopyran-based, a spiropyran-based, and a fulgide-based sublimable photochromic dye may be used. By using the sublimable photochromic dye as described above, when the photochromic resin body is produced by the present production method, it is possible to produce a photochromic resin body having a higher photochromic performance and a further suppressed color unevenness. That is, when the photochromic resin body is produced in the present production method, a photochromic resin body having particularly high color developability and suppressed color unevenness can be produced with using the sublimable photochromic dye as described above. In addition, when the photochromic resin body is produced in the present production method, it is possible to produce a photochromic resin body in which a changed color (developed color) can be returned in a short time by using the sublimable photochromic dye as described above. In a case where a lens is used as the resin body, for example, a photochromic lens that does not require a long time to change the color is more preferable.

For example, as the sublimable photochromic dye, it is preferable to use a sublimable photochromic dye having a melting point higher than a glass transition temperature (the glass transition temperature differs depending on the material of the resin body) of the resin body to which the photochromic performance is added. By using such sublimable photochromic dye, when the photochromic performance is fixed to the resin body in the third step, it is possible to easily prevent the sublimable photochromic dye from melting out, thereby preventing color unevenness. For example, when a sublimable photochromic dye having a melting point lower than the glass transition temperature of the resin body is used, it is possible to fix the sublimable photochromic dye to the resin body at a heating temperature lower than the glass transition temperature of the resin body with using a chiral agent or the like. Therefore, it is possible to prevent the sublimable photochromic dye from melting out, thereby preventing color unevenness.

For example, the sublimable photochromic dye may be at least one sublimable photochromic dye. In this case, for example, one sublimable photochromic dye (for example, a spirooxazine-based sublimable photochromic dye or the like) may be used alone. Further, for example, in this case, in addition to a spirooxazine-based sublimable photochromic dye, at least one sublimable photochromic dye (e.g., one sublimable photochromic dye, two sublimable photochromic dyes, three sublimable photochromic dyes, four sublimable photochromic dyes, etc.) may be used.

For example, when a plurality of sublimable photochromic dyes are used for the resin body, the first step may be configured to simultaneously apply the plurality of sublimable photochromic dyes to the base body. Further, for example, when a plurality of sublimable photochromic dyes are used for the resin body, the first step may be configured to apply the plurality of sublimable photochromic dyes to the base body at different timings.

For example, the resin body may be a resin body containing as a material at least any one of polycarbonate-based resin (e.g., diethylene glycol bis-allyl carbonate polymer (CR-39)), polyurethane-based resin (Trivex), allyl-based resin (e.g., allyl diglycol carbonate and copolymer thereof, diallyl phthalate and copolymer thereof), fumarate-based resin (e.g., benzyl fumarate copolymer), stylene-based resin, polymethyl acrylate-based resin, fiber-based resin (e.g., cellulose propionate), highly refractive material such as thiourethane-based or thioepoxy; and nylon-based resin (polyamide-based resin).

For example, a receiving layer in which the sublimable photochromic dye can be easily fixed may be provided on the resin body. For example, the production method of the present disclosure can be applied to a resin body that does not include a receiving layer. For example, the sublimable photochromic dye is fixed to the resin body provided with the receiving layer. For example, the receiving layer can stably hold the sublimable photochromic dye. For example, when the receiving layer is provided on the resin body, the sublimable photochromic dye can be held in the resin body in a more stable state than in a case where the sublimable photochromic dye is directly deposited on the resin body. In addition, it is possible to more favorably change the color tone and the color density of the photochromic resin body.

For example, the receiving layer can be applied to (deposited on, coated on) the resin body by various methods. For example, the various methods include at least one of spin coating, spray coating, dip coating, bar coating, flow coating, cap coating, knife coating, die coating, roll coating, gravure coating method, screen printing, brush coating, and the like. As a method of providing the receiving layer, a method different from the method described above may be used. For example, the receiving layer may be applied by a coating apparatus including a brush, a roller, a spray, or the like. Further, for example, an operator may use a brush, a roller, a spray, or the like to apply the receiving layer to the resin body.

For example, at least one of a polyurethane resin, a polymethacrylic acid ester resin, a nitrocellulose, a polyethylene resin, a polyester resin, a polyether resin, and a polyurea resin may be used as the receiving layer. The receiving layer is not limited to the above configuration.

In the present embodiment, for example, in addition to the sublimable photochromic dye, a sublimation dye for adjustment for adjusting the color of the resin body may be used. For example, at least one of yellow, blue, and red dyes may be used as the sublimation dye for adjustment. A sublimation dye having a color other than the above may be used. For example, dyes of mixed colors (green, purple, etc.) may be used.

Further, for example, in addition to the sublimable photochromic dye, a functional dye for adding a function to the resin body may be used. In this case, for example, while adding the photochromic performance to the resin body, other functions may be added as well. For example, as the function to be added, a function of reducing a transmittance of light in a specific wavelength range (for example, a wavelength range of a blue region, etc.) may be added.

For example, in the present embodiment, the production system 100 is used to perform the steps in the method of producing the photochromic resin body. For example, a schematic configuration of a production system 100 according to the present embodiment will be described with reference to FIG. 2. The production system 100 of the present embodiment includes a dye coating apparatus 10, an evaporation apparatus 30, and a dye fixing apparatus (fixing apparatus) 50.

For example, in the first step, the dye coating apparatus 10 is used. For example, the dye coating apparatus 10 is used to apply a sublimable photochromic dye evaporated onto a resin body (the lens 8 in the present embodiment) to the base body 2 to obtain the function-adding base body 1 to which the sublimable photochromic dye is applied. For example, in the second step, the evaporation apparatus 30 is used. For example, the evaporation apparatus 30 is used to set the function-adding base body 1 to face the resin body, to heat the function-adding base body so as to sublimate the sublimable photochromic dye applied to the function-adding base body 1, and to deposit the sublimable photochromic dye on the resin body. For example, in the third step, the fixing apparatus 50 is used. For example, the fixing apparatus 50 is used to heat the resin body on which the sublimable photochromic dye is deposited, so as to fix the sublimable photochromic dye on the resin body.

Hereinafter, a method of producing the photochromic resin body will be described in detail. In the following description, a case of producing a photochromic lens by adding a function to a lens (for example, the lens 8), which is a resin body, with using the vapor phase transfer dyeing method will be described as an example.

<First Step>

For example, the first step is a process of applying the sublimable photochromic dye to the base body 2 with the dye coating apparatus 10 so as to obtain (produce) the function-adding base body 1. For example, in the first step, the dye coating apparatus 10 deposits the sublimable photochromic dye, which is to be evaporated onto the lens 8 later, on the base body 2, so as to form a dye portion 6. For example, the base body 2 is a medium for temporarily holding the sublimable photochromic dye used for adding the photochromic performance to the lens 8. The base body 2 will be described in detail later.

In the present embodiment, for example, a printing apparatus is used as the dye coating apparatus 10. For example, in the present embodiment, in the first step, a function-adding ink containing the sublimable photochromic dye is printed on the base body 2 with using the printing apparatus to obtain the function-adding base body 1.

As described above, for example, in the first step, the function-adding ink containing the sublimable photochromic dye is printed on the base body with using the printing apparatus to obtain the function-adding base body 1. Therefore, an application amount of the sublimable photochromic dye can be easily controlled with high accuracy, and the sublimable photochromic dye can be easily and uniformly applied to the base body. In addition, it is possible to easily apply the photochromic dye in various design patterns. In addition, the use of the printing apparatus reduces the used sublimable photochromic dye. In the present embodiment, since a process of drying the ink printed by the printing apparatus is performed, the sublimable photochromic dye can be held more firmly.

In the present embodiment, for example, the sublimable photochromic dye may be dissolved in a solvent of the ink. For example, the function-adding ink is placed in an ink container (for example, an ink pack, an ink cartridge, or the like) for inkjet printer, and the ink container is attached to a mounted unit 14 of the inkjet printer 11. In the present embodiment, a case where an ink cartridge 13 is used as the ink container will be described as an example. For example, the function-adding ink is placed in the ink cartridge 13 for inkjet printer, and the cartridge 13 is amounted to the mounted unit 14 of the inkjet printer 11.

In the present embodiment, for example, a case in which the inject printer 11 is used as the printing apparatus will be described as an example. In this case, for example, the sublimable photochromic dye is applied to the base body 2 by printing with the inkjet printer 11. In the present embodiment, for example, the injector printer 11 includes the mounted unit 14, an inkjet head 15, and a control unit 16. The injector printer 11 is not limited to the above configuration.

For example, the mounted unit 14 mounts the ink container (for example, the ink cartridge 13 described later) of the function-adding ink containing the sublimable photochromic dye. For example, the inkjet head 15 discharges the function-adding ink toward the base body 2 from the ink container of the function-adding ink added to the mounted unit 14 and the ink container of the dyeing ink. As a result, the function-adding ink is printed on the base body 2. For example, the control unit 16 controls driving of the inkjet head 15 to inject the function-adding ink from the inkjet head 15.

For example, in order to print function-adding inks 85 containing the sublimable photochromic dye for adding the photochromic performance on the base body 2 by using the inkjet printer 11, a discharge amount of each function-adding ink to be printed is adjusted using a personal computer 12 (hereinafter, referred to as PC).

In the present embodiment, the amount of the function-adding ink containing the sublimable photochromic dye is stored in the memory 20 as color data. Further, as the color data, the color density of the photochromic resin body to which the photochromic performance is added is stored in the memory 20. For example, when the operator selects color data which the operator desires, it is possible to call the color data from the memory 20 and reproduce the addition of the same photochromic performance (color by the sublimable photochromic dye) for any number of times. In addition, for example, since shading of the color of the sublimable photochromic dye is digitally managed, it is possible to obtain a color of the same density for any number of times when necessary. That is, it is possible to reproduce a photochromic performance that changes to the color tone or the color density desired by the operator with respect to the resin body.

For example, a density gradient of the sublimable photochromic dye deposited on the lens can be acquired by a gradation function provided in drawing software or the like. For example, gradation corresponding to preference may be set in advance, and stored as unique gradation data (color data) in the PC 12. For example, various designs (for example, a gradation pattern having a density gradient, a single-color design, an image, or the like) can be added as the desired photochromic performance (color by the desired sublimable photochromic dye).

A density of the sublimable photochromic dye applied to the base body 2 may be changeable. For example, the density of the sublimable photochromic dye is changed by controlling the discharge amount of the function-adding ink. The density of the color added to the resin body can be changed by changing the density of the sublimable photochromic dye deposited on the base body 2. In this case, for example, the density of the sublimable photochromic dye may be selectable, and the color data at the time of applying the sublimable photochromic dye at the selected density may be selected for each density of the sublimable photochromic dye.

For example, paper, metal plate (for example, aluminum, iron, copper, or the like), glass, or the like may be used as the base body 2 on which the sublimable photochromic dye is printed by the printing apparatus. In the following description, the base body 2 will be described using paper as an example. In the present embodiment, for example, a sheet-like base body is used as the base body 2. In the following description, the printing apparatus will be described by using the inject printer 11 as an example. For example, the base body 2 is placed in the injector printer 11, and printing is performed through operation of the PC 12 so as to obtain a preset function addition, color, and color density.

In the present embodiment, the configuration in which the inkjet printer 11 is used as the printing apparatus in the dye coating apparatus 10 has been described as an example, whereas the configuration of the printing apparatus is not limited thereto. The printing apparatus may be configured to apply the sublimable photochromic dye to the base body 2 by performing printing using a laser printer. In this case, for example, the sublimable photochromic dye is deposited on the base body 2 by a laser printer using a toner.

In the present embodiment, the configuration in which the sublimable photochromic dye is applied to the base body 2 using the printing apparatus as the dye coating unit 10 has been described as an example, whereas the configuration of the dye coating unit 10 is not limited thereto. For example, the dye coating apparatus 10 may be configured such that the sublimable photochromic dye can be applied to the base body 2. For example, the dye coating apparatus 10 may deposit the function-adding ink on the function-adding base body 1 by driving a dispenser (liquid quantitative coating apparatus), a roller, or the like. In addition, for example, an operator may use a brush, a roller, or a spray to apply the function-adding ink to the function-adding base body 1 without using the dye coating apparatus 10. The sublimable photochromic dye may be applied to the base body 2 without being made into ink.

When the sublimable photochromic dye is applied to the base body 2, the sublimable photochromic dye may be applied at least once. For example, the sublimable photochromic dye may be applied to the base body 2 by applying one time (for example, by printing or the like one time), or the sublimable photochromic dye may be applied to the base body 2 by applying a plurality of times (for example, printing a plurality of times). That is, the number of times when the sublimable photochromic dye is applied to the base body 2 may be changed depending on the color or the color density.

<Function-Adding Ink>

For example, the function-adding ink is applied to the base body 2. For example, the function-adding ink is used to heat the function-adding base body to which the function-adding ink is applied, so as to sublimate the sublimable photochromic dye applied to the function-adding base body 1, and to deposit the sublimable photochromic dye on the resin body, thereby adding the photochromic performance to the resin body.

For example, the function-adding ink may contain water, a moisturizer, and a dispersant.

For example, the moisturizer may be at least one of glycerin, propylene glycol, dipropylene glycol, tripropylene glycol, and sorbitol. For example, since the moisturizer is contained, drying of the ink can be prevented without adversely affecting the performance of the resin body after the addition of the photochromic performance. The moisturizer is not limited to the above configuration. For example, the moisturizer may be configured to be capable of preventing drying of the ink.

For example, the dispersant may be any of an anionic surfactant, a nonionic surfactant, and the like. More preferably, the dispersant may be an anionic surfactant. For example, the dispersant is contained, sublimation of the sublimable photochromic dye can be suitably performed and stability of the ink can be improved, without adversely affecting the performance of the resin body after addition of the photochromic performance. The dispersant is not limited to the above configuration. For example, the dispersant may be any one that microparticulates and disperses the sublimable photochromic dye in an aqueous medium, and that has a function of correcting dispersion stability of the microparticulated sublimable photochromic dye.

For example, as the anionic surfactant, at least one of formalin condensate of naphthalene sulfonate, lignin sulfonate, formalin condensate of special aromatic sulfonate, formalin condensate of creosote oil sulfonate, polyoxyethylene alkyl ether sulfate, and the like may be used. For example, the nonionic surfactant may be any one of polyoxyethylene solder bin fatty acid ester, polyoxyethylene alkyl ether, polyoxyethylene alkyl phenyl ether, polyoxyethylene derivative, oxyethylene-oxypropylene block copolymer, and the like. More preferably, an ethylene oxide adduct of a linear alcohol having 25 to 150 carbon atoms may be used.

For example, the function-adding ink may further contain a surfactant for adjusting a surface tension. For example, since the surfactant for adjusting the surface tension in the function-adding ink is contained, the function-adding ink can be easily applied. In particular, in a case where the function-adding ink is applied using an inkjet printer, for example, when the surface tension of the function-adding ink is high, the function-adding ink may be difficult to be discharged from the inkjet head of the inkjet printer. For example, the surfactant for adjusting the surface tension in the function-adding ink is contained, the ink can be easily discharged from the inkjet head of the inkjet printer, the application amount of the function-adding ink can be easily adjusted, and the function-adding ink can be favorably applied.

For example, the function-adding ink may further contain a viscosity modifier. For example, since the viscosity modifier in the function-adding ink is contained, the application amount of the function-adding ink can be easily controlled. In particular, in a case where the function-adding ink is applied using an inkjet printer, for example, when a viscosity of the function-adding ink is high, the function-adding ink may be difficult to be discharged from the inkjet head of the inkjet printer. In addition, in a case where the function-adding ink is applied using an inkjet printer, for example, when a viscosity of the function-adding ink is lower, the function-adding ink may be unnecessarily discharged from the inkjet head of the inkjet printer. For example, the viscosity modifier for adjusting the surface tension in the function-adding ink is contained, the ink can be easily discharged from the inkjet head of the inkjet printer, the application amount of the function-adding ink can be easily adjusted, and the function-adding ink can be favorably applied.

<Second Step>

As described above, the second step is performed using the function-adding base body 1 obtained in the first step. For example, the second step is a process of setting the function-adding base body 1 obtained in the first step to face a resin body (in the present embodiment, the lens 8), of heating the function-adding base body so as to sublimate the sublimable photochromic dye applied to the function-adding base body 1, and of depositing the sublimable photochromic dye on the lens 8. For example, in the second step, the evaporation apparatus 30 is used.

For example, the evaporation apparatus 30 heats the sublimable photochromic dye deposited on the function-adding base body 1 with an electromagnetic wave so as to sublimate the sublimable photochromic dye toward the lens 8. As a result, the sublimable photochromic dye is deposited on the lens 8. The lens 8 may be formed with various layers such as a receiving film for facilitating fixing of the sublimable photochromic dye in the third step described later.

The evaporation apparatus 30 according to the present embodiment includes an electromagnetic wave generating part 31, a depositing jig 32, a pump 36, and a valve 37. The configuration of the evaporation apparatus 30 is not limited to the above configuration.

For example, the electromagnetic wave generating part 31 generates an electromagnetic wave. In the present embodiment, as one example, a halogen lamp that generates infrared light is used as the electromagnetic wave generating part 31. However, the electromagnetic wave generating part 31 may be any one that generates an electromagnetic wave. Accordingly, instead of the halogen lamp, any configuration that generates electromagnetic waves having other wavelengths such as ultraviolet rays and microwaves may be used.

For example, the evaporation apparatus 30 irradiates the function-adding base body 1 with electromagnetic waves, thereby increasing the temperature of the sublimable photochromic dye in short time. In a case of sublimating the sublimable photochromic dye on the function-adding base body 1, it is also conceivable to heat the sublimable photochromic dye by bringing an iron plate or the like heated to a high temperature into contact with the function-adding base body 1. However, it is difficult to bring the function-adding base body 1 and the iron plate or the like into uniform contact (for example, without gaps) with each other. Unless the contact state is uniform, the sublimable photochromic dye is not uniformly heated, resulting in color unevenness of the sublimable photochromic dye and so on. On the other hand, the evaporation apparatus 30 according to the present embodiment enables uniform heating of the sublimable photochromic dye with the electromagnetic waves from the electromagnetic wave generating part 31 placed at a distance from the function-adding base body 1.

For example, the depositing jig 32 holds the function-adding base body 1 and the lens 8. The depositing jig 32 according to the present embodiment is provided with a lens supporting part 33 and a base body supporting part 34. The lens supporting part 33 includes a cylindrical base portion and a mount table placed inside the base portion. The lens 8 is supported on the mount table of the lens supporting part 33 in a state where the lens 8 is surrounded by the base portion. The base body supporting part 34 is located at an upper end of the cylindrical base portion to support the function-adding base body 1 above the lens 8. Even though the details are not illustrated, when an outer peripheral edge portion of the function-adding base body 1 is placed on the base body supporting part 34, an annular base-body retainer member is put from above on the outer peripheral edge portion of the function-adding base body 1. The position of the function-adding base body 1 is thus fixed. In the related art, in order to prevent contamination of the evaporation apparatus 30, a plate-like glass may be further placed on an upper surface of the function-adding base body 1 held by the base body supporting part 34 so as to prevent the sublimated sublimable photochromic dye from escaping and spreading on a back side of the function-adding base body 1.

For example, the function-adding base body 1 is placed so that a surface deposited with the sublimable photochromic dye faces the lens 8. In the present embodiment, since the function-adding base body 1 is supported above the lens 8, the function-adding base body 1 is disposed in the base body supporting part 34 so that the surface deposited with the sublimable photochromic dye faces down.

For example, the function-adding base body 1 may face the lens 8 in a non-contact manner (for example, a distance of 2 mm to 30 mm). In this case, for example, in the second step, the function-adding base body 1 obtained in the first step is set to face the lens 8 in a non-contact manner, and the function-adding base body 1 is heated so as to sublimate the sublimable photochromic dye applied to the function-adding base body 1, and the sublimable photochromic dye is deposited on the lens 8.

For example, since the function-adding base body 1 faces the lens 8 in the non-contact manner, it is possible to prevent the heat, generated when the function-adding base body is heated to sublimate the sublimable photochromic dye, from being conducted to the resin body. As a result, it is possible to prevent discoloration, shrinkage, or the like of the resin body due to the heat.

In addition, for example, since a distance is generated between the function-adding base body and the resin body by facing each other in the non-contact manner, the sublimable photochromic dye can be sufficiently dispersed and deposited on the resin body. As a result, unevenness of the photochromic dye deposited on the resin body can be further prevented, and a good photochromic resin body can be produced. In particular, in a case where a gradation pattern is applied to the function-adding base body, the gradation pattern can be suitably reproduced on the resin body. When the function-adding base body 1 is set to face the lens 8, those may be set to face each other in a contact manner.

For example, the pump 36 exhausts air in the evaporation apparatus 30 to the outside, thereby decreasing air pressure of the inside of the evaporation apparatus 30. That is, for example, the pump 36 exhausts air in the evaporation apparatus 30 to the outside, thereby setting the evaporation apparatus 30 to a predetermined degree of vacuum.

For example, in the second step, when the lens 8 is placed in the evaporation apparatus 30 to deposit the sublimable photochromic dye on the lens 8, the inside of the evaporation apparatus 30 is set to the predetermined degree of vacuum by the pump 36 so as to perform deposition operation. In the present embodiment, for example, the inside of the evaporation apparatus 30 is set to a predetermined degree of vacuum, but is not limited thereto, and the deposition operation may be performed with the inside of the evaporation apparatus 30 under normal pressure.

For example, after the vacuum state, the function-adding base body 1 is heated from above using the electromagnetic wave generating part 31 to sublimate the sublimable photochromic dye. For example, when the heating temperature is lower than 100° C. on the function-adding base body 1, the sublimable photochromic dye is unlikely to be sublimated from the function-adding base body 1, and, for example, when the temperature exceeds 250° C., deterioration of the sublimable photochromic dye due to high temperature or deformation of the lens 8 or re-sublimation of the sublimable photochromic dye due to radiant heat is likely to occur. Therefore, the heating temperature may be between 100° C. and 250° C., whereas the heating temperature may be selected as high as possible in accordance with the material of the lens 8 and the sublimable photochromic dye.

For example, the second step may be a process of performing evaporation at least once. In this case, for example, the evaporation may be repeated a plurality of times (for example, twice) by using a plurality of function-adding base bodies 1. Such method is useful, for example, when the amount of the sublimable photochromic dye to be applied to the resin body is large or when a plurality of kinds of sublimable photochromic dyes (for example, five kinds or the like) are used.

<Third Step>

For example, when the second step is completed, the third step is performed. The third step will be described below. For example, the third step is a process of heating the lens 8 on which the sublimable photochromic dye is deposited in the second step, so as to fix the sublimable photochromic dye.

For example, the dye fixing apparatus 50 is used to heat the lens 8 to which the sublimable photochromic dye is deposited, so as to fix the sublimable photochromic dye on the lens 8. For example, the sublimable photochromic dye is fixed to the lens 8 by heating the lens 8. Thereby, it is possible to add the photochromic performance to the lens 8.

For example, in the present embodiment, an oven is used as the dye fixing apparatus 50. Since a temperature of the lens 8 gradually increases over a long period of time with using an oven (particularly, a blower type constant temperature incubator), a temperature difference is unlikely to occur. Therefore, the sublimable photochromic dye is easily fixed to the lens 8 uniformly.

For example, when the third step is performed, the sublimable photochromic dye may be fixed by heating under normal pressure. The third step may be performed under a different air pressure. In this case, for example, since the fixing is performed under higher pressure, the sublimable photochromic dye can be fixed to the lens 8 at a lower heating temperature. Therefore, the sublimable photochromic dye can be prevented from melting out or re-sublimation. For example, the operator takes out the lens 8 on which the sublimable photochromic dye is deposited after the sublimable photochromic dye is deposited on the lens 8 in the evaporation apparatus 30. For example, the operator places the lens 8 in the dye fixing apparatus 50 and heats the lens 8 under normal pressure so as to fix the sublimable photochromic dye.

For example, in the present embodiment, the heating temperature is a temperature at which sufficient color development is possible without deforming the lens 8. For example, the heating temperature may be 110° C. or more and 160° C. or less (110° C. to 160° C.). For example, the third step may be a process of heating, at 110° C. to 160° C., the resin body on which the sublimable photochromic dye is deposited in the second step, so as to fix the sublimable photochromic dye on the resin body. For example, due to the fixing of the sublimable photochromic dye at a temperature of 110° C. or higher in the third step, the sublimable photochromic dye is likely to diffuse in the resin body (the lens 8 in the present embodiment). As a result, the photochromic performance can be added satisfactorily. In addition, for example, after the third step, it is possible to prevent escape of the photochromic dye (missing color) from the resin body to which the photochromic performance is added (in the present embodiment, the lens 8). In addition, for example, due to the fixing of the sublimable photochromic dye at a temperature of 160° C. or lower in the third step, it is possible to prevent the resin body from being excessively heated, and it is possible to make the resin body more unlikely to be deformed. In the present embodiment, the above temperature is exemplified as the temperature at which the resin body is unlikely to be deformed, but is not limited thereto. For example, in a case of a resin body having high heat resistance, even if fixing is performed at a higher temperature according to the resin body, the resin can be unlikely to be deformed.

As described above, for example, the method of producing photochromic resin body according to the present disclosure includes: the first step of applying the sublimable photochromic dye having sublimability to the base body so as to obtain the function-adding base body; the second step of setting the function-adding base body obtained in the first step to face a resin body, of heating the function-adding base body so as to sublimate the sublimable photochromic dye applied to the function-adding base body, and of depositing the sublimable photochromic dye on the resin body; and the third step of heating the resin body on which the sublimable photochromic dye is deposited in the second step so as to fix the sublimable photochromic dye on the resin body. As a result, a good photochromic resin body can be easily obtained.

In addition, the method exhibits particularly excellent effects as a production method capable of adding a photochromic performance to the resin body in various design patterns such as a fine design and a gradation design, and capable of improving the designability. Further, for example, it is possible to add the photochromic performance to the resin body in the same design pattern, thereby improving the reproducibility of the design pattern when the photochromic resin body is produced.

Further, for example, since the sublimable photochromic dye is applied to the base body and the sublimable photochromic dye applied to the base body is deposited on the resin body, the sublimable photochromic dye can be used for addition of the photochromic performance to the resin body without waste. That is, the photochromic performance can be added to the resin body with less sublimable photochromic dye.

In the present embodiment, the heating method of the function-adding base body 1 is described as an example, but is not limited thereto. For example, the heating method of the function-adding base body 1 can sublimate the sublimable photochromic dye in the same manner even by heating from a side surface or from below.

It is also possible to change the configuration of the dye fixing apparatus 50. For example, the dye fixing apparatus 50 may heat the lens 8 by scanning the lens 8 with laser. In this case, the dye fixing apparatus 50 can intentionally cause a temperature difference depending on the part of the lens 8. For example, the dye fixing apparatus 50 may control scanning of the laser depending on the target gradation, for example, when the sublimable photochromic dye is applied in a form of gradation. The dye fixing apparatus 50 may control scanning of the laser depending on the thickness of the lens 8 or the like in order that the temperature of each part of the lens 8 becomes a desired temperature. Further, the dye fixing apparatus 50 may heat the lens by directly irradiating the lens 8 with electromagnetic waves.

Further, two or more of the steps performed in each of the dye coating apparatus 10, the evaporation apparatus 30, and the dye fixing apparatus 50 (for example, the first step, the second step, the third step, and the like) may be performed by a single apparatus. For example, a producing apparatus may be used to perform both the second step performed by the evaporation apparatus 30 and the third step performed by the dye fixing apparatus 50. In this case, for example, heating of the function-adding base body 1 in the second step and heating of the lens 8 in the third step may be performed using the same heating unit (for example, an infrared heater or the like). The apparatus may be configured to automatically perform a sequence of a plurality of steps (e.g., from the second step to the third step).

For example, a coating (for example, a hard coat, an antireflection coating, an antifouling coating, or the like) may be further applied to the photochromic resin body. For example, the coating may be performed to enhance certain functions in the photochromic resin body.

The receiving layer may be provided on the lens 8. For example, the receiving layer can stably hold the sublimable photochromic dye. For example, when the receiving layer is provided on the lens 8, the sublimable photochromic dye can be held on the lens 8 in a stable state as compared with a case where the sublimable photochromic dye is directly deposited on the lens 8. In addition, it is possible to change the color tone and the color density of the lens 8 more favorably.

For example, at least one of a polyurethane resin, a polymethacrylic acid ester resin, a nitrocellulose, and a polyethylene resin may be used as the receiving layer. The receiving layer is not limited to the above configuration.

For example, the receiving layer can be applied to (deposited on, coated on) the lens 8 by various methods. The various methods may be any one as long as the receiving layer is deposited on the lens 8. For example, the various methods include at least one of spin coating, spray coating, dip coating, bar coating, flow coating, cap coating, knife coating, die coating, roll coating, gravure coating method, screen printing, brush coating, and the like. As a method of providing the receiving layer, a method different from the method described above may be used. For example, the receiving layer may be applied on the lens 8 by a coating apparatus including a brush, a roller, a spray, or the like. Further, for example, an operator may use a brush, a roller, a spray, or the like to apply the receiving layer to the lens 8.

Hereinafter, the present disclosure will be specifically described with reference to experimental examples, but the present disclosure is not limited to the following experimental examples. In the following Experimental Examples 1 to 24, a sublimable photochromic dye was deposited on a surface of a resin body, and a photochromic resin body on which the sublimable photochromic dye was deposited was heated to fix the sublimable photochromic dye on the resin body, so as to obtain the photochromic resin body.

Experimental Example 1

First, a function-adding ink used in the printer was produced. As a sublimable photochromic dye, 1,3,3-trimethyl-spiro[benzo[e]indole-2,3'-[3H]-naphtho[2,1-b][1,4]oxazine](produced by New Prismatic Enterprise CO, LTD), which is a spirooxazine-based sublimable photochromic dye, was used. For example, the sublimable photochromic dye, pure water, and a dispersant were put in a container, sufficiently stirred, so as to produce the function-adding ink. For example, Demall MS (Kao Corporation) was used as the dispersant. For example, a composition ratio of the dye, the dispersant, and pure water was 6.0 wt % of the dye, 6.0 wt % of the dispersant, and 88.0 wt % of pure water.

In order to disperse the sublimable photochromic dye, after the dispersant was sufficiently stirred, a container containing the function-adding ink was put in a container containing water for cooling, and processing was performed for a specified time using an ultrasonic homogenizer to set the sublimable photochromic dye to a desired particle size. Then, the function-adding ink was suction-filtered with a filter having a pore diameter of about 1 μm (glass fiber filter paper GF/B), so as to remove particles having a large particle size, dust, and the like. Thereafter, pure water was added so as to obtain a specified ink density, and if necessary, a moisturizer or a surfactant for adjusting a surface tension was added to produce a function-adding ink. In order to disperse, an ultrasonic homogenizer was used this time, whereas a microparticulating apparatus such as a bead mill may be used as well. In this manner, the function-adding ink was produced.

In this experimental example, the produced function-adding ink was injected into a cyan ink cartridge of an inkjet printer (RJ-1300V2, produced by Mutoh Industries Ltd.).

The function-adding ink was applied by discharging and printing the sublimable photochromic dye on a base body (high quality PPC paper) having a paper thickness of 100 μm and a back surface painted black by using printing control software produced by Nisshinbo, so as to be painted in a circular shape of Φ90 mm at a max cyan concentration (1024) on the base body, to thereby produce a function-adding base body.

Photochromic performance was added using the function-adding base body obtained thereby. The function-adding base body was attached to a dyeing jig in an evaporation apparatus (TTM-1000; produced by Nidek), so as to perform evaporation operation of the sublimable photochromic dye to a CR39 lens (S-0.00). At this time, a distance between an attachment surface side of the sublimable photochromic dye of the CR39 lens and the function-adding base body was set to 15 mm. After an air pressure in the evaporation apparatus was lowered to 60 Pa or less by a pump, a surface temperature of the function-adding base body was heated to 200° C. by a heating unit (using a halogen lamp in this experimental example). A temperature in the vicinity of the function-adding base body was measured with a thermocouple by a temperature sensor (not shown), and the halogen lamp was turned off at the same time as reaching 100° C., so as to sublimate and deposit the sublimable photochromic dye.

Thereafter, an air pressure in the evaporation apparatus was returned to normal pressure, and then heated in an oven for 2 hours in order to fix the sublimable photochromic dye. A heating temperature of the oven at this time was 135° C., and the CR39 lens on which the sublimable photochromic dye was deposited was heated to fix the sublimable photochromic dye. In this way, a function was added to the CR39 lens. The following evaluations were performed after the function addition. The results are shown in FIG. 3.

[Photochromic Performance (Color Developability) Evaluation]

The produced photochromic CR39 lens was irradiated with ultraviolet rays for a certain period of time (1 minute in this experimental example) by setting a handy UV lamp (LUV-15, 365 nm, 22 W) (produced by AS ONE Corporation) to face the photochromic CR39 lens from a height of 50 mm, and was visually confirmed whether the color was changed. The irradiation of ultraviolet rays was stopped, and after a specified time (10 minutes in this experimental example), the color was visually confirmed.

The color of the lens was greatly changed when irradiated with ultraviolet rays, and the color change returned after the ultraviolet irradiation was stopped: excellent The color of the lens was changed when irradiated with ultraviolet rays, and the color change returned after the ultraviolet irradiation was stopped: good The color of the lens was greatly changed or changed when irradiated with ultraviolet rays, whereas the color change was unlikely to returned after the ultraviolet irradiation was stopped, and took time (10 minutes or more) until the color change returned: good Although ultraviolet rays were irradiated, the color of the lens was not changed: poor

[Lens Color Unevenness Evaluation]

With respect to the produced photochromic lens, the color unevenness of the produced photochromic CR39 lens was visually confirmed, and was confirmed whether or not color unevenness occurred. The color after color development was visually confirmed.

Almost no color unevenness was observed: excellent
Slight color unevenness was observed: good
Color unevenness was observed: poor Experimental Example 2

The photochromic performance was added and evaluated in the same manner as in Experimental Example 1, except that a medium-refractive lens was used instead of the CR39 lens. The results are shown in FIG. 3.

Experimental Example 3

The photochromic performance was added to a CR39 lens and evaluated in the same manner as in Experimental Example 1, except that 6'-indolino-1,3,3-trimethyl-spiro[indole-2,3'-[3H]-naphtho[2,1-b][1,4]oxazine] (produced by New Prismatic Enterprise Co., Ltd.), which is a spirooxazine-based sublimable photochromic dye, was used instead of 1,3,3-trimethyl-spiro[benzo[e]indole-2,3'-[3H]-naphtho[2,1-b][1,4]oxazine] as the sublimable photochromic dye. The results are shown in FIG. 3.

Experimental Example 4

The photochromic performance was added and evaluated in the same manner as in Experimental Example 3, except that a medium-refractive lens was used instead of the CR39 lens. The results are shown in FIG. 3.

Experimental Example 5

The photochromic performance was added to a CR39 lens and evaluated in the same manner as in Experimental Example 1, except that 3,3-diphenyl-3H-naphtho[2,1-b]pyran (produced by New Prismatic Enterprise Co., Ltd.), which is a naphthopyran-based sublimable photochromic dye, was used instead of 1,3,3-trimethyl-spiro[benzo[e]indole-2,3'-[3H]-naphtho[2,1-b][1,4]oxazine] as the sublimable photochromic dye. The results are shown in FIG. 3.

Experimental Example 6

The photochromic performance was added and evaluated in the same manner as in Experimental Example 5, except that a medium-refractive lens was used instead of the CR39 lens. The results are shown in FIG. 3.

Experimental Example 7

The photochromic performance was added to a CR39 lens and evaluated in the same manner as in Experimental Example 1, except that 3(4-methoxy)phenyl-3H-naphtho[2,1-b]pyran (produced by New Prismatic Enterprise Co., Ltd.), which is a naphthopyran-based sublimable photochromic dye, was used instead of 1,3,3-trimethyl-spiro[benzo[e]indole-2,3'-[3H]-naphtho[2,1-b][1,4]oxazine] as the sublimable photochromic dye. The results are shown in FIG. 3.

Experimental Example 8

The photochromic performance was added and evaluated in the same manner as in Experimental Example 7, except that a medium-refractive lens was used instead of the CR39 lens. The results are shown in FIG. 3.

Experimental Example 9

The photochromic performance was added to a CR39 lens and evaluated in the same manner as in Experimental Example 1, except that 6-trifluoromethyl-1,3,3-trimethyl-6'- piperidino-spiro[indole-2,3'-[3H]-naphtho[2,1-b][1,4] oxazine] (produced by New Prismatic Enterprise Co., Ltd.), which is a spirooxazine-based sublimable photochromic dye, was used instead of 1,3,3-trimethyl-spiro[benzo[e]indole-2,3'-[3H]-naphtho[2,1-b][1,4]oxazine] as the sublimable photochromic dye. The results are shown in FIG. 3.

Experimental Example 10

The photochromic performance was added and evaluated in the same manner as in Experimental Example 9, except that a medium-refractive lens was used instead of the CR39 lens. The results are shown in FIG. 3.

Experimental Example 11

The photochromic performance was added to a CR39 lens and evaluated in the same manner as in Experimental Example 1, except that 1,3-dihydro-1,3,3-trimethyl-6'-(1-piperidinyl)-spiro[2H-indole-2,3'-[3H]-naphtho[2,1-b][1,4]oxazine] (produced by Kiroku Sozai Sogo Kenkyujo), which is a spirooxazine-based sublimable photochromic dye, was used instead of 1,3,3-trimethyl-spiro[benzo[e]indole-2,3'-[3H]-naphtho[2,1-b][1,4]oxazine] as the sublimable photochromic dye. The results are shown in FIG. 3.

Experimental Example 12

The photochromic performance was added and evaluated in the same manner as in Experimental Example 11, except that a medium-refractive lens was used instead of the CR39 lens. The results are shown in FIG. 3.

Experimental Example 13

The photochromic performance was added to a CR39 lens and evaluated in the same manner as in Experimental Example 1, except that 2,2-diphenyl-2H-naphtho[2,1-b]pyran (produced by Kiroku Sozai Sogo Kenkyujo), which is a naphthopyran-based sublimable photochromic dye, was used instead of 1,3,3-trimethyl-spiro[benzo[e]indole-2,3'-[3H]-naphtho[2,1-b][1,4]oxazine] as the sublimable photochromic dye. The results are shown in FIG. 3.

Experimental Example 14

The photochromic performance was added and evaluated in the same manner as in Experimental Example 13, except that a medium-refractive lens was used instead of the CR39 lens. The results are shown in FIG. 3.

Experimental Example 15

The photochromic performance was added to a CR39 lens and evaluated in the same manner as in Experimental Example 1, except that 1,3,3-trimethylindolino-6'-nitrobenzopyrospirane (produced by Tokyo Chemical Industry Co., Ltd.), which is a spiropyran-based sublimable photochromic dye, was used instead of 1,3,3-trimethyl-spiro[benzo[e]indole-2,3'-[3H]-naphtho[2,1-b][1,4]oxazine] as the sublimable photochromic dye. The results are shown in FIG. 3.

Experimental Example 16

The photochromic performance was added and evaluated in the same manner as in Experimental Example 15, except that a medium-refractive lens was used instead of the CR39 lens. The results are shown in FIG. 3.

Experimental Example 17

The photochromic performance was added to a CR39 lens and evaluated in the same manner as in Experimental Example 1, except that (E)-3-(adamantane-2-ylidene)-4-[1-(2,5-dimethyl-3-noryl)ethylidene]dihydro-2,5-furandione (produced by Tokyo Chemical Industry Co., Ltd.), which is a fulgide-based sublimable photochromic dye, was used instead of 1,3,3-trimethyl-spiro[benzo[e]indole-2,3'-[3H]-naphtho[2,1-b][1,4]oxazine] as the sublimable photochromic dye. The results are shown in FIG. 3.

Experimental Example 18

The photochromic performance was added and evaluated in the same manner as in Experimental Example 17, except that a medium-refractive lens was used instead of the CR39 lens. The results are shown in FIG. 3.

Experimental Example 19

The photochromic performance was added to a CR39 lens and evaluated in the same manner as in Experimental Example 1, except that 4,4'-bis(hexyloxy)-3-methylazobenzene (produced by Tokyo Chemical Industry Co., Ltd.), which is an azobenzene-based sublimable photochromic dye, was used instead of 1,3,3-trimethyl-spiro[benzo[e]indole-2,3'-[3H]-naphtho[2,1-b][1,4]oxazine] as the sublimable photochromic dye. The results are shown in FIG. 3.

Experimental Example 20

The photochromic performance was added and evaluated in the same manner as in Experimental Example 19, except that a medium-refractive lens was used instead of the CR39 lens. The results are shown in FIG. 3.

Experimental Example 21

The photochromic performance was added to a CR39 lens and evaluated in the same manner as in Experimental Example 1, except that 4,4'-bis(decyloxy)-3-methylazobenzene (produced by Tokyo Chemical Industry Co., Ltd.), which is an azobenzene-based sublimable photochromic dye, was used instead of 1,3,3-trimethyl-spiro[benzo[e]indole-2,3'-[3H]-naphtho[2,1-b][1,4]oxazine] as the sublimable photochromic dye. The results are shown in FIG. 3.

Experimental Example 22

The photochromic performance was added and evaluated in the same manner as in Experimental Example 21, except that a medium-refractive lens was used instead of the CR39 lens. The results are shown in FIG. 3.

Experimental Example 23

The photochromic performance was added to a CR39 lens and evaluated in the same manner as in Experimental Example 1, except that 1,2-bis(2,4-dimethyl-5-phenyl-3-thienyl)-3,3,4,4,5,5-hexafluoro-1-cyclopentene (produced by Tokyo Chemical Industry Co., Ltd.), which is a diarylethene-based sublimable photochromic dye, was used instead of 1,3,3-trimethyl-spiro[benzo[e]indole-2,3'-[3H]-naphtho

[2,1-b][1,4]oxazine] as the sublimable photochromic dye. The results are shown in FIG. 3.

Experimental Example 24

The photochromic performance was added and evaluated in the same manner as in Experimental Example 23, except that a medium-refractive lens was used instead of the CR39 lens. The results are shown in FIG. 3.

As shown in FIG. 3, according to Experimental Examples 1 to 24, it was confirmed that the photochromic lens produced by the production method of the present disclosure had photochromic performance and had suppressed color unevenness. That is, it was confirmed that according to the production method of the present disclosure, a good photochromic lens can be produced. In addition, it was confirmed that according to the production method of the present disclosure, a photochromic lens capable of color development of red, blue, and yellow can be produced.

Further, according to Experimental Examples 1 to 18, it was confirmed that, when a photochromic resin body is produced with this method by using a sublimable photochromic dye of at least one of spirooxazine-based, naphthopyran-based, spiropyran-based, and fulgide-based as the sublimable photochromic dye, a photochromic resin body having higher photochromic performance and further suppressed color unevenness can be produced. In addition, the changed color returned without requiring a long time until the changed color returned. In particular, when the photochromic performance is applied to a lens, a photochromic lens that does not require a long time to change the color is more preferable.

1 Function-adding base body
2 Base body
8 Lens
10 Dye coating apparatus
11 Inkjet printer
12 Personal computer
13 Ink cartridge
14 Mounted unit
15 Inkjet head
16 Control unit
20 Memory
30 Evaporation apparatus
50 Dye fixing apparatus
100 Production system

What is claimed is:

1. A method of producing a photochromic resin body, comprising:
   a first step of applying a sublimable photochromic dye having sublimability to a base body with changing a density of the sublimable photochromic dye applied to the based body to obtain a function-adding base body;
   a second step of setting the function-adding base body obtained in the first step to face a resin body, by heating the function-adding base body to sublimate the sublimable photochromic dye applied to the function-adding base body, and of depositing the sublimable photochromic dye on the resin in a state having a density gradient of the deposited photochromic dye: and
   a third step of heating the resin body on which the sublimable photochromic dye is deposited, wherein the resin body on which the sublimable photochromic dye is deposited in the state having the density gradient in the second step to fix the sublimable photochromic dye on the resin body.

2. The method of producing the photochromic resin body according to claim 1, wherein the sublimable photochromic dye is at least one selected from the group consisting of spiroosazine-based, a naphthopyran-based, a spiropyran-based, and a fulgide-based sublimable photochromic dye.

3. The method of producing the photochromic resin body according to claim 1, wherein in the second step, the function-adding base body obtained in the first step is set to face the resin body in a non-contact manner, the function-adding base body is heated to sublimate the sublimable photochromic dye applied to the function-adding base body, and the sublimable photochromic dye is deposited on the resin body.

4. The method of producing the photochromic resin body according to claim 1, wherein in the first step, a function-adding ink containing the sublimable photochromic dye is printed on the base body with using a printing apparatus to obtain the function-adding base body.

5. The method of producing the photochromic resin body according to claim 1, wherein the resin body is a lens.

* * * * *